April 8, 1924.
J. CHÂTEAU
1,489,519
FILTERING DEVICE FOR LIQUID CARBURETANTS
Filed Feb. 7, 1922
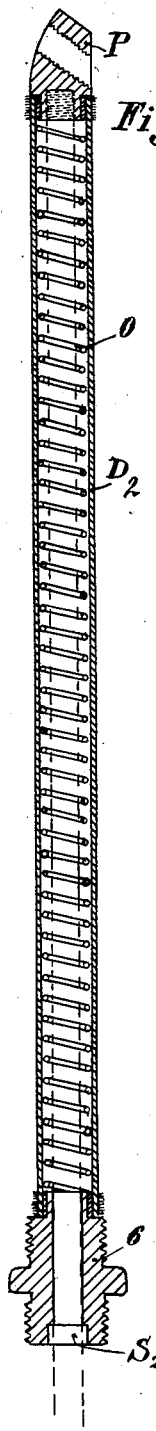
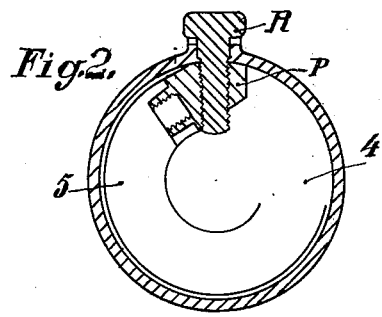
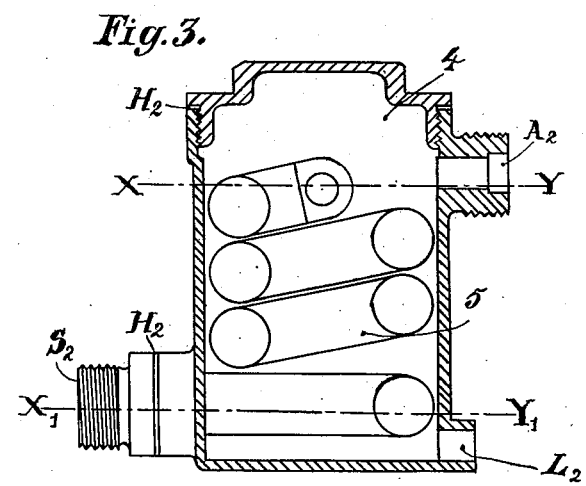
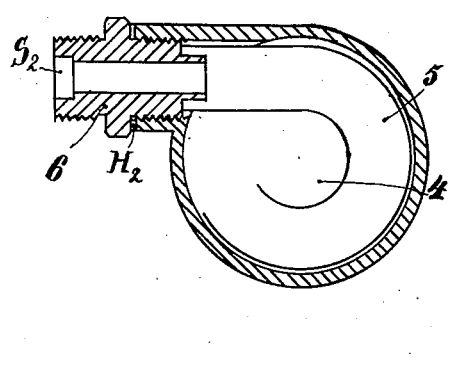

Patented Apr. 8, 1924.

1,489,519

UNITED STATES PATENT OFFICE.

JULES CHÂTEAU, OF MILLAU, FRANCE.

FILTERING DEVICE FOR LIQUID CARBURETANTS.

Application filed February 7, 1922. Serial No. 534,698.

*To all whom it may concern:*

Be it known that I, JULES CHÂTEAU, residing at Millau, France, have invented new and useful Improvements in Filtering Devices for Liquid Carburetants, of which the following is a specification.

The invention relates to a filter for the liquid carburetant serving particularly for supply of gas engines, and comprising a casing having inlet and outlet openings, a spiral tubular element arranged in the casing and the wall of which is permeable by the material to be filtered, said tubular element having a closure at one end secured in the casing and having an outlet end arranged to discharge into the discharge opening of the casing and a spiral spring in said tubular element and supporting the wall thereof against distortion as hereinafter described and claimed.

The accompanying drawings are given solely by way of example, wherein:

Figure 1 is a detail sectional view of the tube element for disposal in the filter chamber.

Figure 2 is a transverse sectional view of a filter construction and arranged for this invention on the plane indicated by the line $x$—$y$ of Figure 3.

Figure 3 is a longitudinal sectional view of the same.

Figure 4 is a transverse sectional view of the same on the plane indicated by the line $x'$—$y'$ of Figure 3.

The filter is constituted by a chamber 4, the apertured washers being replaced by a tube 5 whose walls $D_2$ (Fig. 1) are constructed of a plastic filtering substance, the said tube being formed in a worm shape by torsion. The filtering substance is applied to a metal frame work constituted by a spiral spring O. The said spring is secured on the one hand to the member P and on the other hand to the connecting member 6 having formed therein an aperture $S_2$ for the discharge of the purified liquid. By inserting into the aperture $S_2$ a screw-threaded rod (shown in Fig. 1) which is screwed into the end piece P, the spring O may be compressed, the length whereof is greater than that of the filtering portion, and in consequence the spring will tend to resume its original length after compression, thereby causing the extension of the substance constituting the walls $D_2$. After inserting the tube 5 into the chamber 4 and securing the connecting piece 6 (Fig 4) the tube 5 is subjected to torsion in order to form the same in a worm shape, the member P being secured against the wall of the apparatus by the screw R (Fig. 2). When the liquid is caused to flow, the latter will enter through $A_2$ into the chamber 4 and will pass through the filtering wall of the worm tube 5, depositing the impurities contained therein. Being now in the pure state, it will flow through the worm tube and will be discharged thereform through the passage $S_2$. The impurities are evacuated through the passage $L_2$. Inasmuch as the said filtering device is of a very simple construction, it is readly mounted and can be renewed with facility by replacing any of the membranes which are deteriorated.

I claim:

1. A filter comprising a casing having inlet and outlet openings, a spiral tubular element arranged in the casing the wall of which is permeable by the material to be filtered, said tubular element having a closure at one end secured in the casing and having its opposite end arranged to discharged through the discharge opening of the casing, and a spiral spring in said tubular element supporting the wall thereof against distortion.

2. A filter comprising a casing having inlet and outlet openings, a spiral tubular element arranged in the casing the wall of which is permeable by the material to be filtered, said tubular element having a closure at one end secured in the casing and having its opposite end provided with a connecting member which is arranged in the discharge opening of the casing, and a spiral spring in said tubular element supporting the wall thereof against distortion.

In witness whereof I affix my signature.

JULES CHÂTEAU.